United States Patent [19]
Aldridge et al.

[11] Patent Number: 5,224,154
[45] Date of Patent: Jun. 29, 1993

[54] LINE POWERED DCA INCLUDING DUAL PROGRAMMED MICROCONTROLLERS

[75] Inventors: Timothy W. Aldridge, Somerville; Dean Y. Hodge, Madison; Harold G. Voce, Hanceville, all of Ala.

[73] Assignee: Universal Data Systems, Inc., Huntsville, Ala.

[21] Appl. No.: 756,256

[22] Filed: Sep. 6, 1991

[51] Int. Cl.[5] ........................ H04M 11/00; H04B 1/38
[52] U.S. Cl. ..................................... 379/93; 379/100; 375/8
[58] Field of Search ........................ 379/93, 96, 97, 98, 379/100; 375/8, 9

[56] References Cited

U.S. PATENT DOCUMENTS

| | | |
|---|---|---|
| 4,373,117 | 2/1983 | Pierce . |
| 4,395,590 | 7/1983 | Pierce et al. . |
| 4,415,774 | 11/1983 | Driver . |
| 4,417,099 | 11/1983 | Pierce . |
| 4,578,533 | 3/1986 | Pierce . |
| 4,592,069 | 5/1986 | Redding ................. 375/8 |
| 4,788,717 | 11/1988 | Blanchard et al. ............ 379/93 |
| 4,803,719 | 2/1989 | Ulrich ................. 379/93 |
| 4,829,559 | 5/1989 | Izawa et al. ............ 379/96 |
| 4,907,254 | 3/1990 | Suzuki et al. ............ 379/93 |
| 4,924,494 | 5/1990 | Shung ................. 379/93 |
| 4,951,309 | 8/1990 | Gross et al. ............ 375/8 |
| 4,961,220 | 10/1990 | Tentler et al. ............ 379/413 |
| 4,981,371 | 1/1991 | Gurak et al. ............ 379/96 |
| 5,014,296 | 5/1991 | Saigano ................. 379/88 |
| 5,065,425 | 11/1991 | Lecomte et al. ............ 379/96 |

OTHER PUBLICATIONS

Vocal's Pocket Modem Eliminates the Need for Outside Power Source P. C. Week, Nov. 13, 1989, p. 99.

Primary Examiner—James L. Dwyer
Assistant Examiner—Jason Chan
Attorney, Agent, or Firm—Wayne J. Egan

[57] ABSTRACT

A line powered data communication apparatus (DCA) includes dual programmed microcontrollers, one being interfaceable with data terminal equipment and the other for governing the operation of modem circuitry of the DCA which is interfaceable to a telephone line of a telephone network. The dual programmed microcontrollers interact with each other over an electrically isolated interface, preferably including optical isolators. Power is derived for the one microcontroller from the signal lines interfacing the data terminal equipment. In addition, power is derived for the other microcontroller and modcircuitry from the telephone line.

12 Claims, 6 Drawing Sheets

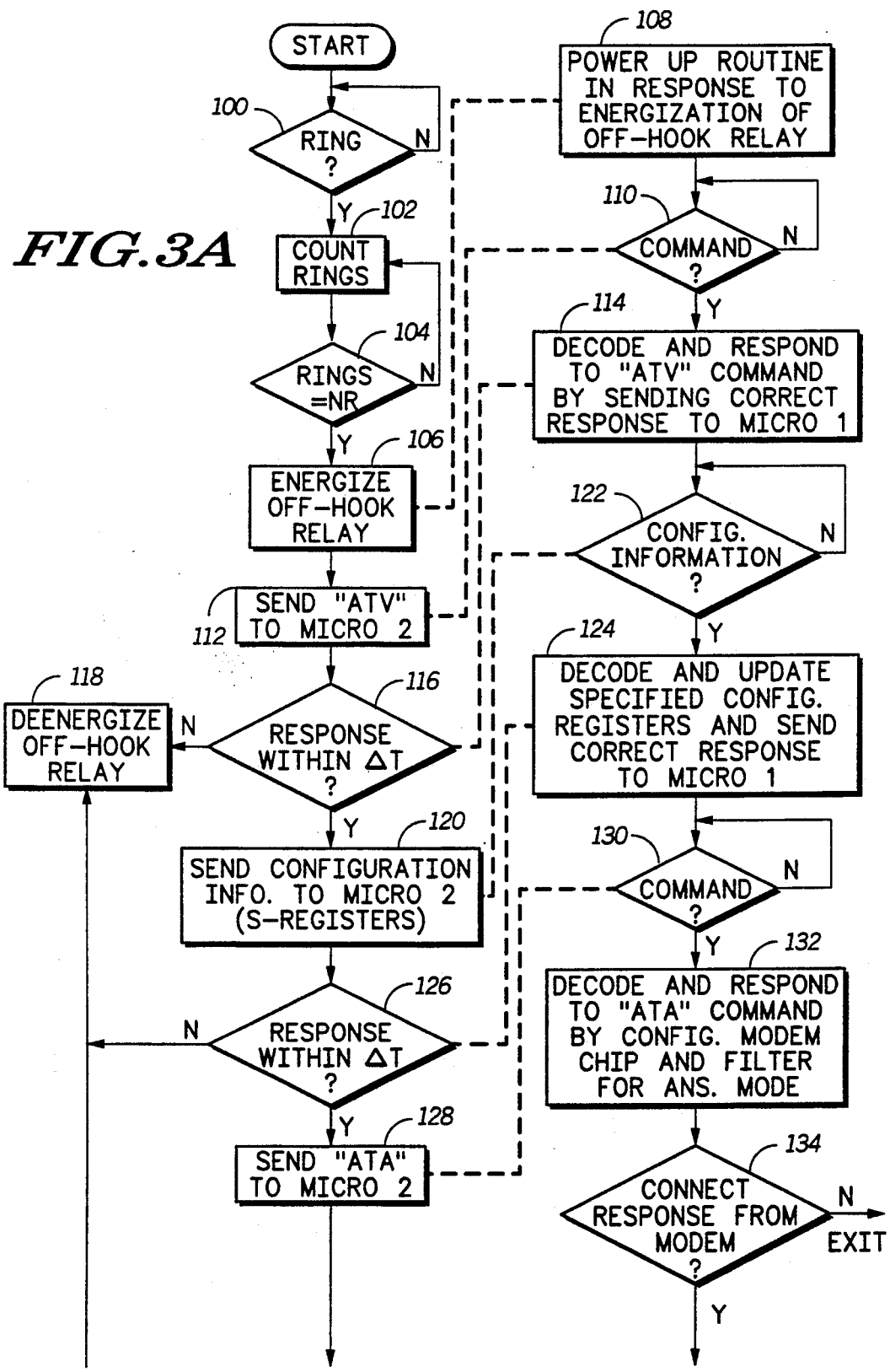

LINE POWERED DCA INCLUDING DUAL PROGRAMMED MICROCONTROLLERS

BACKGROUND OF THE INVENTION

The present invention relates to line powered data communication apparatus (DCA) in general, and more particularly, to a line powered DCA with dual programmed digital signal processors (DSP's), one being interfaceable with data terminal equipment and the other for governing the operation of modem circuitry which is interfaceable to a telephone line of a telephone network, the dual programmed DSP's interacting with each other over an electrically isolated interface.

Line powered DCA's, which may include modems, for example, generally comprise one side or portion which is interfaceable with data terminal equipment (DTE) and another side or portion interfaceable with the telephone network, the two sides being electrically isolated from one another. The DCA circuitry of the one side deriving its power from the DTE interface and the DCA circuitry of the other side deriving its power from the telephone network connection. Early versions of the line powered modem lacked the capability of performing automatically functions such as dial, answer or configuration, for example. Examples of these early models are found in the U.S. Pat. No. 4,578,533 issued Mar. 25, 1986; U.S. Pat. No. 4,417,099 issued Nov. 22, 1983; U.S. Pat. No. 4,415,774 issued Nov. 15, 1983; U.S. Pat. No. 4,395,590 issued Jul. 26, 1983; and U.S. Pat. No. 4,373,117 issued Feb. 8, 1983, all assigned to the same assignee as the instant application. Another patent reference is the U.S. Pat. No. 4,592,069 issued May 27, 1986. In addition, these early versions included a substantial number of electrically isolating devices which were relatively expensive compared with the cost of the other circuit elements.

To eliminate some of the electrically isolating devices and provide some automatic features, the more recent versions of the line powered modems included a single microcontroller disposed on the DTE side for interfacing with the DTE and electrically isolated from the telephone line side thereof. Examples of these more contemporary units are found in the U.S. Pat. No. 4,961,220 issued Oct. 2, 1990 (filed Dec. 21, 1988); and U.S. Pat. No. 4,907,254 issued Mar. 6, 1990. A further example of a line powered modem product employing a single microcontroller is the Stowaway 2400 manufactured by Vocal Technologies Ltd. which was announced in an article in PC Week on Nov. 13, 1989.

While these more recent models appear to alleviate the drawbacks of the earlier versions by providing some automatic features and reducing the number of electrically isolating devices, there remains room for further improvement. More specifically, further flexibility for adding additional features is still desired on the telephone line side which is presently limited to either hard-wired circuitry or a custom integrated circuit. In addition, a further reduction in the number of electrically isolating devices is desired especially because of their relative high costs. The present invention intends to provide for the additional flexibility for adding more features and for a reduction in the number of isolating devices.

SUMMARY OF THE INVENTION

In accordance with the present invention, data communication apparatus (DCA) comprises: on one side thereof, first programmed digital signal processor (DSP) means interfaceable to data terminal apparatus (DTA) over a plurality of first signal lines for exchanging command and data information therebetween; and first source of power for deriving power from at least one of the first signal lines to supply the power to the first programmed DSP means, and on another side thereof, second programmed DSP means coupled to the first programmed DSP means by a plurality of second signal lines for exchanging command and data information therebetween; modem means coupled to the second programmed DSP means and interfaceable to a telephone line of a telephone network, the modem means being governed by the second programmed DSP means to establish a call connection over the telephone line and to condition data exchanged between the second programmed DSP means and the telephone line during a call connection; and second source of power for deriving power from the telephone line to supply the power to the second programmed DSP means and modem means. The DCA further includes means for electrically isolating the one side from the another side. In one embodiment, the electrically isolating means includes an electrically isolating device, preferably an optical isolator, disposed in each of the second signal lines.

BRIEF DESCRIPTION OF THE DRAWINGS

FIGS. 3A and 3B are flowcharts exemplifying an auto answer routine suitable for use in the dual microcontroller embodiment of FIG. 1.

DESCRIPTION OF THE PREFERRED EMBODIMENT

Figure 1:
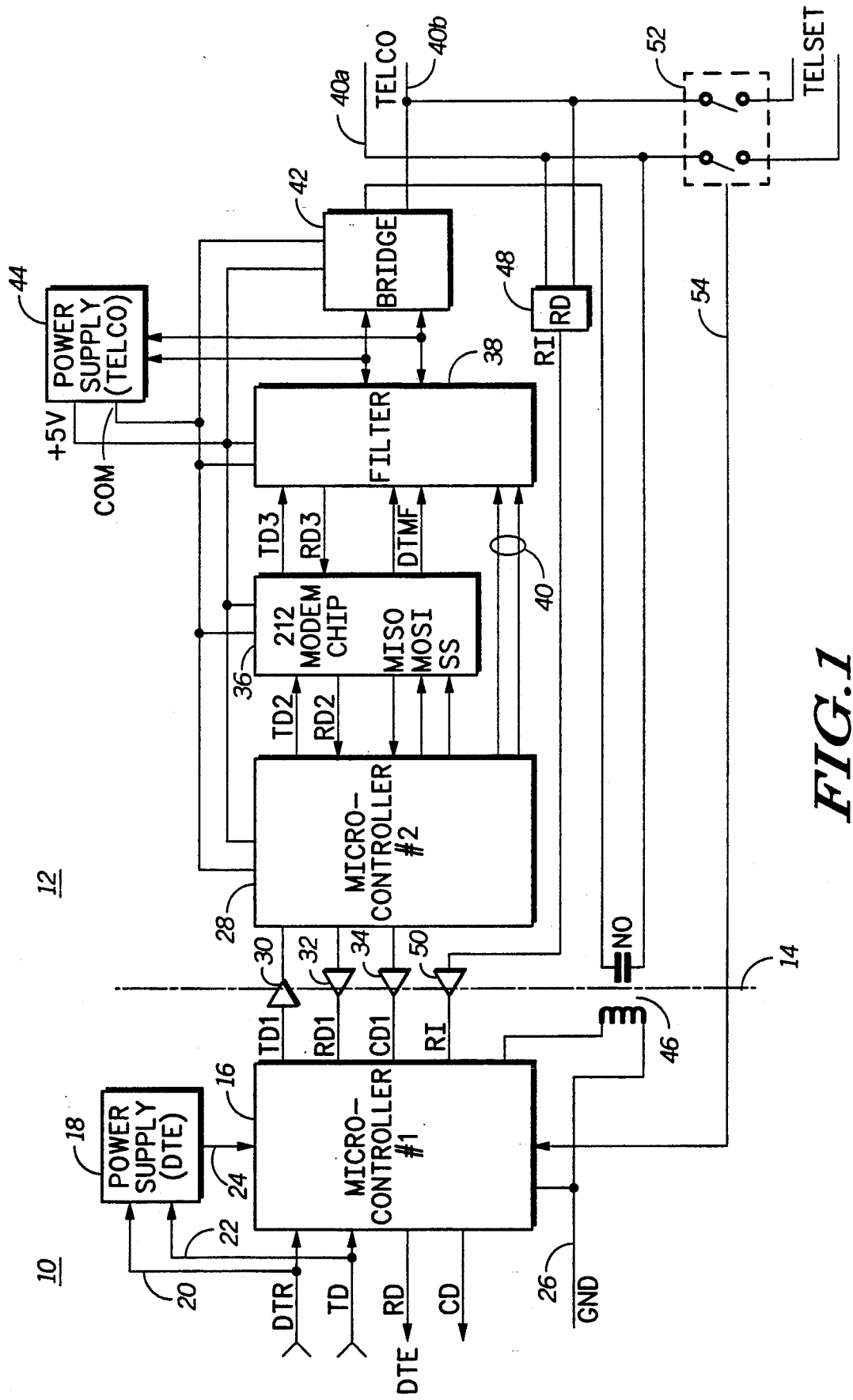
FIG. 1 is a block diagram schematic of a line powered modem suitable for embodying the principles of the present invention.

In FIG. 1 is depicted a block diagram schematic of a line powered modem suitable, by way of example, for embodying the principles of the present invention. The modem or data communication apparatus may be divided into two sides or portions 10 and 12 which are electrically isolated from one another as illustrated by the dashed line 14. Disposed on the side 10 is a programmed digital signal processor or microcontroller which may be of the type manufactured by Motorola Corporation bearing Model No. 68HC05, for example. This particular microcontroller is an integrated circuit including random access memory (RAM) for temporary storage of data, a read only memory (ROM) for the storage of operational programs and fixed data and a plurality of input/output ports for serial and parallel digital data entry and exit, respectively. The microcontroller 16 is of a low power variety which may be powered by a source of 3V or so and may operate with a 1 MHz crystal clock with an internal clock operation of approximately ½ that frequency.

The microcontroller 16 of the present embodiment is interfaceable to data terminal equipment (DTE) using a set of signal lines including data terminal ready (DTR), transmit data (TD), read data (RD) and carrier detect (CD) which are typical of an RS-232C protocol. Power for the microcontroller 16 is derived from at least one of the DTE interface lines by a power supply or source 18 disposed on the side 10. More specifically, the power source 18 is coupled to the DTR and TD interface lines by respective lines 20 and 22 and provides power to the microcontroller 16 over a power line 24. The return or ground line 26 of the microcontroller 16 is coupled to the ground of the DTE in the present embodiment.

A second programmed digital signal processor or microcontroller 28 which may be of the same type as the microcontroller 16 is disposed on the other side 12 and interfaces with the microcontroller 16 through a set of interface lines crossing the isolation boundary 14. The interface lines include the signal transmit data (TD1), read data (RD1) and carrier detect (CD1). Each of the interface lines between the microcontrollers 16 and 28 include an electrically isolating device 30, 32, and 34, respectively, to maintain the electrical isolation boundary 14. In the present embodiment, the electrically isolating devices are optical isolators which may be of the type manufactured by General Electric bearing the Model No. H11G3, for example.

Also included on side 12 is a modem function 36 governed by the microcontroller 28 for establishing a call connection over a 2-line telephone network connection such as that shown at 40a and 40b, for example, and to condition data exchanged between the microcontroller 28 and telephone line during the call connection. In the present embodiment, the modem function includes a custom integrated circuit manufactured by Motorola Corporation bearing Model No. SC42387F which incorporates the conventional functions of modulation, demodulation, controller, status register and pattern and tone generation. In the present embodiment, the modem function empathizes the Bell 212 standard of communication protocol operating at 300–1200 baud, for example. The governing interface between the microcontroller 28 and modem chip 36 includes a signal line TD2 for conducting serially commands and digital data to be communicated over the telephone lines, a signal line RD2 for conducting serially commands and digital data received from the telephone lines, and a 3-wire serial bus comprising the signals master in/slave out (MISO), master output/slave input (MOSI), and slave select (SS). In this embodiment, the microcontroller 28 is considered the master and the modem integrated circuit 36 is considered the slave and the 3-wire bus is used by the microcontroller 28 to monitor and set-up certain status registers of the modem chip 36, such as carrier detect (CD), test mode . . . etc.

Also included on side 12 as part of the modem section is a line filter 38 which may be comprised of discreet components using a series of 14575 operational amplifiers, for example. Both of the modem chip and the filter used in the present embodiment have been used in line powered modems previously manufactured by Universal Data Systems and marketed for more than 1 year prior to the instant application. The line filter 38 is interfaced to the modem chip 36 utilizing the signal lines TD3, RD3 and 2 lines for the DTMF tone signals. The filter 38 is governed by the microcontroller 28 using two control signals shown at 40, which signals set the operational mode thereof, e.g. answer mode, originate mode, connect mode...etc. Still further, on the other side 12, the telephone lines are interfaceable to the filter 38 through a conventional bridge circuit 42 which performs a well-known rectification function on the analog signals received from the telephone lines. The rectified analog signals are provided to the filter 38 and also to a second power supply or source 44 for deriving power therefrom. The power source 44 is coupled to the microcontroller 28, modem chip 36, filter 38 and bridge 42 to supply power thereto.

Disposed in the telephone line 40a is a normally open contact NO of an OFF-hook relay 46 which is energized and deenergized by the microcontroller 16. Coupled to the telephone line connection points 40a and 40b upstream of the contact NO is a conventional ring detect (RD) circuit 48 which provides an output ring indication signal (RI) which is coupled to the microcontroller 16 with an electrically isolating device across the boundary 14. In the present embodiment, this electrically isolating device 50, like the others, includes an optical isolator. Still further, the telephone line connections 40a and 40b are also coupled to a talk/data switch 52 which is coupled to a telset jack of the modem. A signal line 54 which provides an indication of the position of the switch 52 is coupled as an input to the microcontroller 16. In the present embodiment, the switch monitoring provided by the signal 54 is electrically isolated from the telephone line connections and telset connections.

Figure 2:
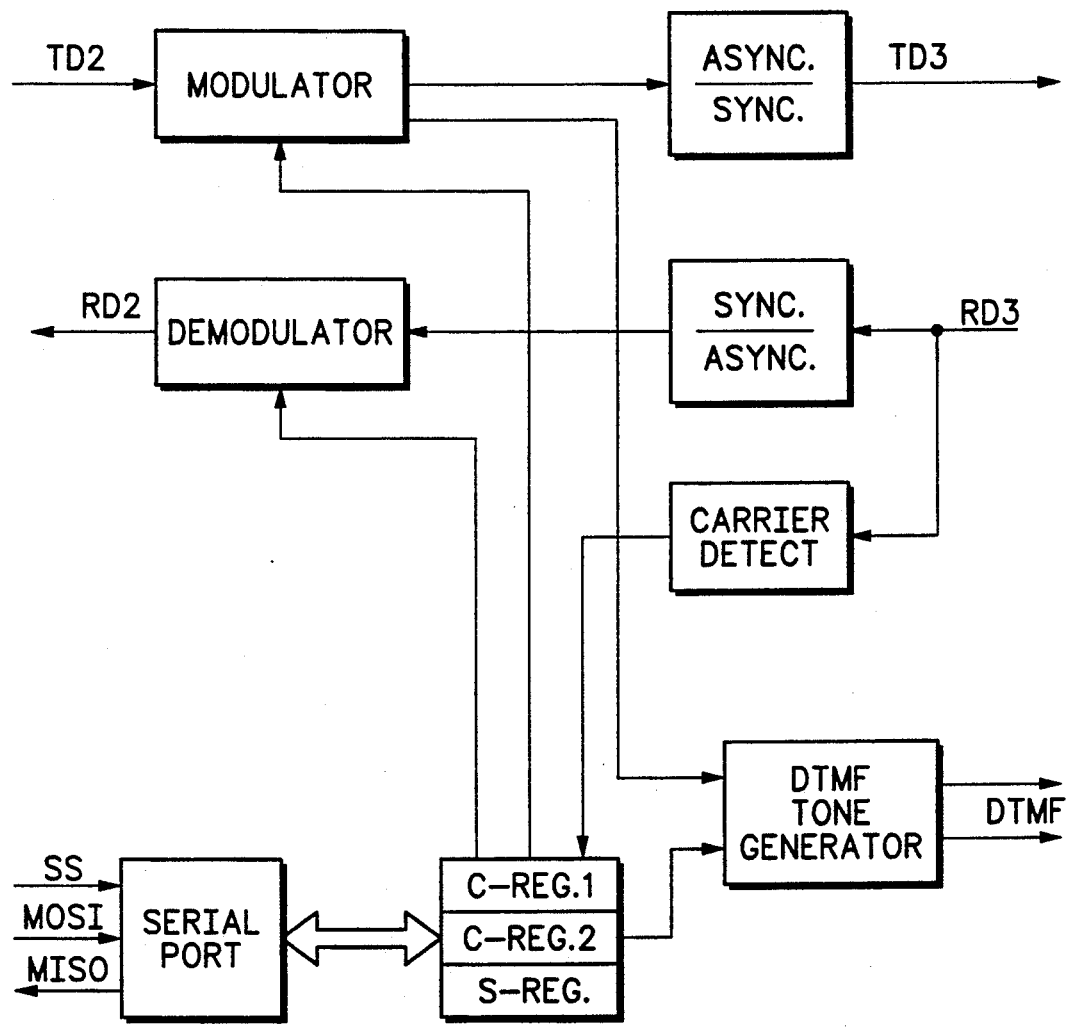
FIG. 2 is a functional block diagram schematic exemplifying a modem chip suitable for use in the embodiment of FIG. 1.

A brief description of the modem chip 36 will now be provided in connection with the functional block diagram schematic of FIG. 2. Referring to FIG. 2, the modem chip 36 provides full duplex modulation and demodulation of the serial binary data TD3 and RD3 at at least two rates 1200 and 300 bps. Disposed in the respective paths of the modulator and demodulator functions are async-to-sync and sync-to-async conversions for transmitting data to and receiving data from the telephone line. Other functions which may be performed by the modem chip 36 include serial control, carrier recovery, receive baud clock recovery, DTMF tone generation, analog loopbacks, and remote digital loopbacks.

More specifically, the modem chip 36 may be controlled via either a serial or parallel interface. In the present embodiment, a serial port interface is used for intelligent modem applications which interact with a master controller, e.g. microcontroller 28. The serial port interface is operative to serially transfer modem control data and status data between the controller 28 and storage registers which include 2 control registers, C-REG.1 and C-REG.2, and 1 status register, S-REG. Tables 1, 2 and 3 found below illustrate the contents of the control and status registers of the instant embodiment. The control registers govern the operations of the modulator, demodulator and DTMF tone generator. The telephone number is conducted to the DTMF generator for auto dial operations via serial path TD2 and the modulator. A carrier detect circuit monitors the status of the carrier signal over path RD3 and updates the status bit CD of the status register in accordance therewith.

TABLE 1

| | 1st Control Register | |
|---|---|---|
| BIT(S) | SIGNAL | FUNCTION DESC. |
| 2 | Mode 0,1 | Controls dial mode and |

TABLE 1-continued

1st Control Register

| BIT(S) | SIGNAL | FUNCTION DESC. |
|---|---|---|
|  |  | baud rate at which chip attempts to connect |
| 1 | RTS | Controls xmit on/off |
| 1 | ANS/ORIG. | Controls answer and originate modes |
| 1 | ALB | Controls analog loop back test |
| 1 | LSI | Controls AUTO/MAN connect seq. |

TABLE 2

2nd Control Register

| BIT(S) | SIGNAL | FUNCTION DESC. |
|---|---|---|
| 2 | Select 1,2 | Selects Async. Bits 11, 10 or 9 or sync. format |
| 1 | CD Phase | Controls response to rising or falling edge of CD |
| 1 | CD Enable | Enable/Disable CD Int. |
| 1 | CTS Enable | Permits Int. to follow CTS |
| 1 | RDL Enable | Remote Digital loop enable |
| 1 | R Mode Enable | Change in modem baud rate |

TABLE 3

Status Register

| BIT | SIGNAL | STATUS |
|---|---|---|
| 1 | CD | Carrier Status |
| 1 | CTS | Clear to send |
| 1 | RDL | Test indicator |
| 1 | R MODE | 300-1200 connect baud rate |

Figure 3B:
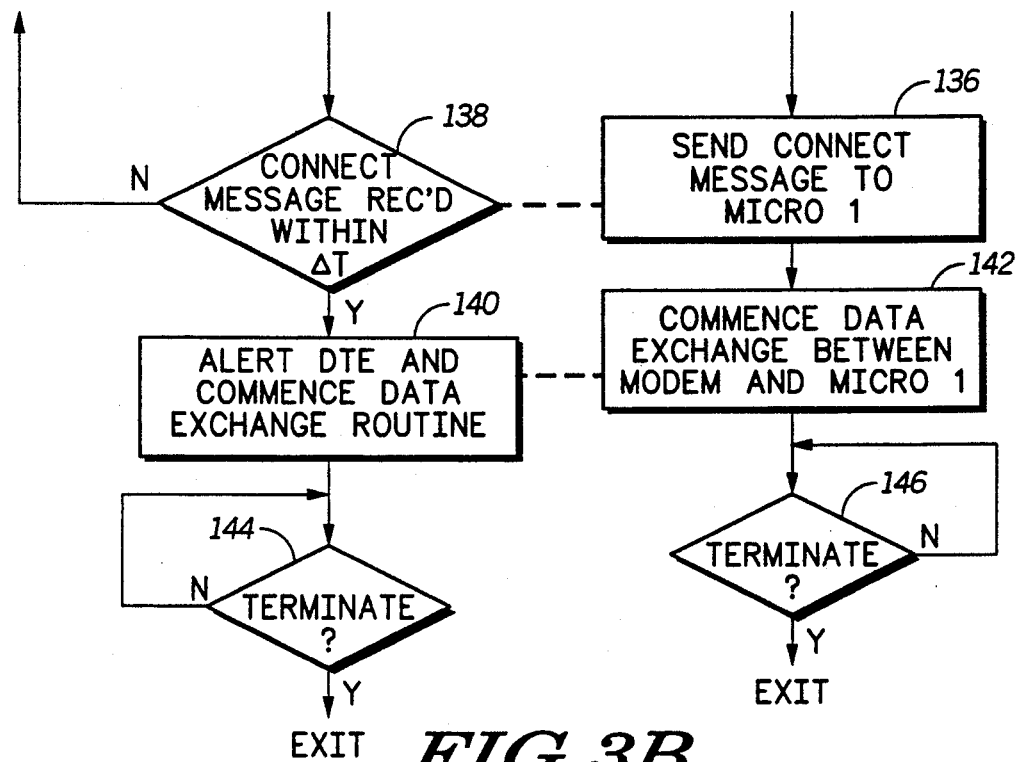
Figure 4:
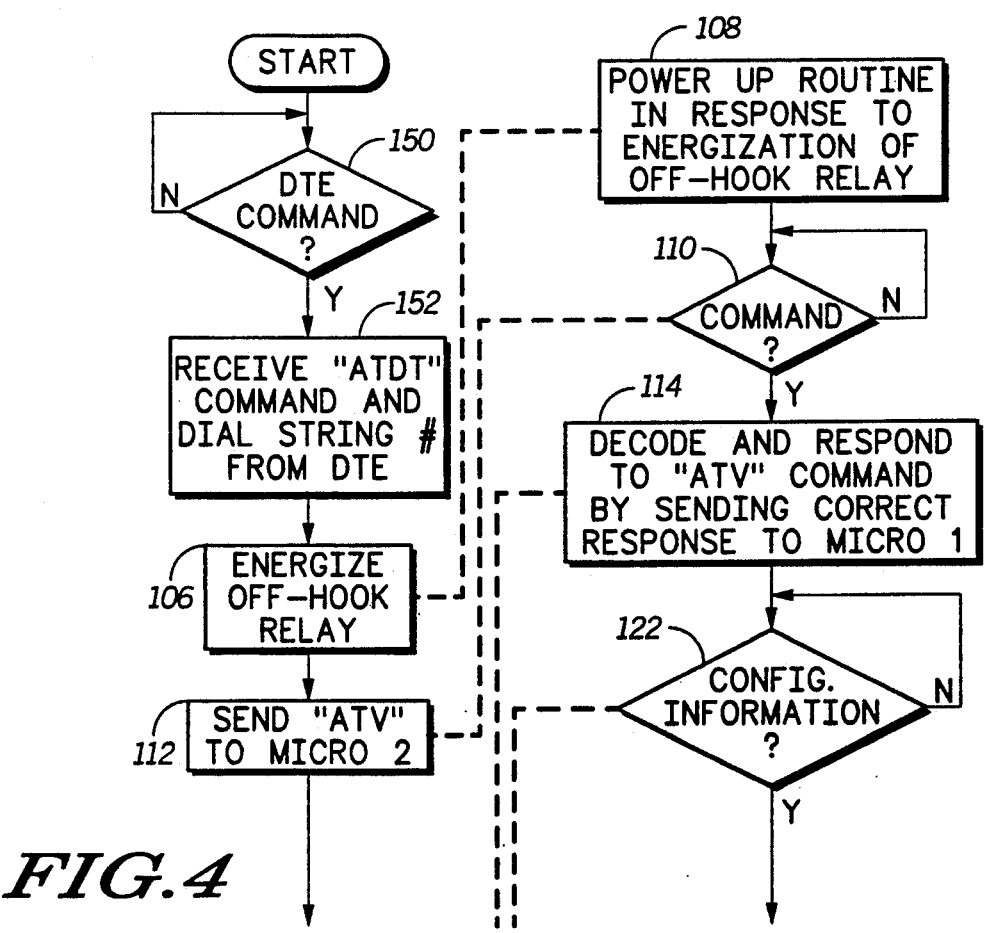
FIGS. 4 and 4A are flowcharts exemplifying an auto dial routine suitable for use in the dual microcontroller embodiment of FIG. 1.
Figure 4A:
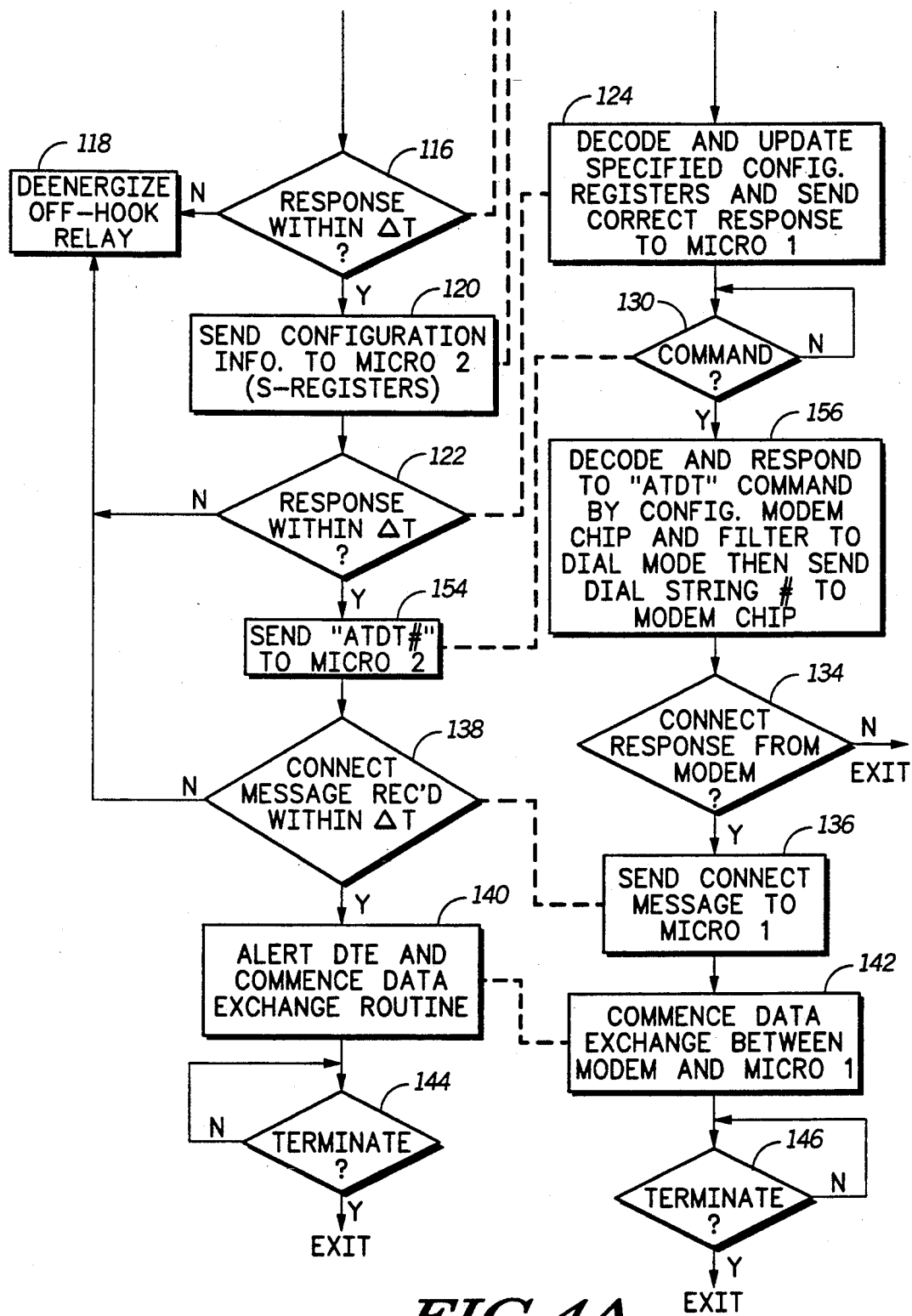

Examples of operation of the dual microcontroller embodiment of FIG. 1 are depicted in the flowcharts of FIGS. 3 and 4. Each of the aforementioned flowcharts exemplify the program execution flow of each microcontroller and the interaction therebetween. In each example, the program flow to the left of the respective figure depicts the operation of the microcontroller 16 and the program flow to the right depicts the operation of the microcontroller 28. The flowchart of FIG. 3 exemplifies an auto answer routine and the flowchart of FIG. 4 exemplifies an auto dial routine.

Referring to FIG. 3, the microcontroller 16 waits in decisional block 100 for a ring indication (RI) signal generated by the ring detector circuit 48 in response to a ringing over the telephone lines 40a, 40b. The RI signal is conducted from the circuit 48 through an optical isolator 50 to the microcontrollers 16. The microcontroller 16 may be preprogrammed by the DTE to answer the call on a predetermined number of rings, say for the present example, 3 rings, which is represented by NR in the flowchart of FIG. 3. The blocks 102 and 104, in combination, count the number of rings of the call until it reaches NR and then, the call is answered by energizing the off-hook relay 46 in the block 106. When the relay 46 is energized, the normally opened (NO) contacts are closed and a telephone line connection is made to the bridge circuit for conducting the call signals through the bridge 42, filter 38 to the modem chip 36. Concurrently, power is derived from the telephone signals, conducted through the bridge 42, by the power supply 44 for supply to the microcontroller 28, modem chip 36, filter 38 and bridge 42.

In response to such power, the microcontroller 28 executes a power up routine which initializes and configures the microcontroller 28 to a start-up state using the instructions of block 108. The microcontroller 28 thereafter waits for a command from the microcontroller 16 in the decisional block 110. Shortly after energizing the relay 46, the microcontroller 16 sends an "ATV" command to the microcontroller 28 over signal line TD1 through isolator 30 as instructed by block 112. This AT command requests a digital response from microcontroller 28 to determine if it has been properly initialized and configured and is currently in the correct mode.

If the microcontroller 28 is in the correct mode, it will receive the AT command by the decisional block 110 and decode and respond to the command by sending the correct response in accordance with the instructions of block 114. In the present embodiment, the microcontroller 28 is programmed to respond with a number of different digital hex characters based on the command received and its current condition. In response to the ATV command, microcontroller 28 has been preprogrammed to respond with an OK message, which is zero or $30_H$.

The microcontroller 16 waits in block 116 for the correct response from the microcontroller 28 over signal line RD1 via isolator 32. If a response is received from microcontroller 28, microcontroller 16 loads the response into a register by a subroutine and compares the contents of the loaded register with the contents of a register which has been prestored with the correct response. If it does not receive a match or receives no response within a $\Delta T$, which for the present example may be 18 seconds or so, the micro controller 16 deenergizes the relay 46 by block 118 to break the connection of the telephone line which removes the source of power to the side 12 of the modem.

On the other hand, if the correct response is received within the $\Delta T$, the microcontroller 16, instructed by block 120, sends configuration information to the microcontroller 28 over signal line TD1 through isolator 30. In the present embodiment, this configuration information is transmitted in the form of a plurality of serial bytes to be stored in a number of corresponding status registers or S-registers of microcontroller 28. The microcontroller 28 responds to the digital codes of the S-registers to determine the mode in which it is intended to operate. For example, the setting of the bit or bits of a predetermined S-register may establish whether or not the modem chip 36 aborts upon the drop of carrier from the telephone line. In another example, another bit or bits being programmed in another predetermined S-register may establish loop back testing or FCC testing. Still further, other bits set in yet another S-register may cause the microcontroller 28 to establish a continuous DTMF tone after a number has been dialed until reception of any key character and then aborted.

The microcontroller 28 receives the configuration information in accordance with the instructions of the decisional block 122 and in the instructional block 124 decodes and updates the specified configuration S-registers and thereafter, sends a correct response back to microcontroller 16 over line RD1 through isolator 32. The correct response may also be an OK message. The microcontroller 16 awaits the correct response in the decisional block 126 and if not received within the ΔT, diverts program execution to block 118 to deenergize relay 46. When a correct response is received, the microcontroller 16 generates and transmits an "ATA" command to the micro controller 28 over the signal line DT1 and isolator 30 using the instructions of block 128. Concomitantly, the microcontroller 28 awaits the command in a decisional block 130. When it receives the ATA command, it decodes and responds to the command by configuring the modem chip 36 (signal TD2) and filter 28 (signal 40) for the operational answer mode in accordance with the contents of the S-registers thereof.

Thereafter, in decisional block 134, the microcontroller 28 monitors the modem chip 36 utilizing the signals SS, MOSI, and MISO in a conventional manner to establish whether or not a connection has been made between the modem chip 36 and the calling party over the telephone line. When the modem chip 36 makes a call connection, it sets at least one status register interval in the chip, which may be the CD status, and sends a connect message or command to microcontroller 28 over signal line RD2. If no connect message is received, program execution of the microcontroller 28 is exited and no connect message is relayed to the micro-controller 16. On the other hand, if a connect message is received and microcontroller 28 determines that the proper status register(s) say, for example, the carrier detect (CD) status, is set in the modem chip 36, it will relay the connect message or command to the microcontroller 16 over the signal line RD1 and set the signal CD1 according to the instructions of block 136. At the same time, the microcontroller 16 is waiting for the connect message in block 138.

If the program execution of microcontroller 28 has been exited by block 134, the microcontroller 16 will not receive the connect message within the time period ΔT and the program execution thereof will be diverted to block 118 for deenergizing the relay 46. When the connect message and signal CD1 are received by the microcontroller 16 within the proper time interval ΔT, the microcontroller 16 alerts the DTE of the impending data exchange. In the present embodiment, this is accomplished by setting the signal line CD in block 140. Thereafter, both of the microcontrollers 16 and 28 commence execution of their respective data exchange routines in the blocks 140 and 142. During this period of data exchange, data in an analog form is provided from the telephone line through the bridge 42 to be filtered by the filter 38 passing over signal line RD3 into the modem chip 36 for demodulation thereby. From the modem chip 36, the converted data is provided over signal line RD2 to the microcontroller 28 which, in turn, supplies the data over signal line RD1 to the microcontroller 16. Accordingly, microcontroller 16 relays the data to the DTE over signal line RD.

This data exchange routine continues until a terminate condition is determined in the decisional blocks 144 and/or 146. A termination condition may be established by the detection of loss of carrier over the telephone line by the modem chip 36. The status bit representing carrier loss is monitored by the microcontroller 28 during the data exchange period, and when a change in status is detected, microcontroller 28 conveys that information via signal line CD1 to the microcontroller 16 which in turn deenergize relay 46 to disconnect the modem from the telephone line and terminate data exchange. Another termination condition may arise as a result of an escape sequence being generated by the DTE over signal line TD to the microcontroller 16 to convert it from a data mode to a command mode. As a result of this conversion, the data exchange routine may be terminated. These examples, of course, are not all inclusive of the termination conditions which may be established in connection with the operational configuration programmed by the DTE and/or preprogrammed in the microcontrollers 16 and 28 by the user.

In the foregoing described operational example, the dual microcontroller modem embodiment depicted in FIG. 1 answers an incoming call automatically, establishes connection between the telephone lines and DTE through the dual microcontrollers, and commences execution of the proper data exchange routines in the microcontrollers such that data is transferred from the telephone line to the DTE.

The next operational example as exhibited in the flowchart of FIG. 4 deals with auto dialing. Note that most of the programmed instructional blocks of the flowchart of FIG. 4 are substantially similar to those of FIG. 3 and for this reason are numbered the same. In this operational example, the microcontroller 16 does not wait for a ring but rather a DTE command in decisional block 150. When the microcontroller 16 detects a command, it receives the command "ATDT" followed by a string of numbers for dialing denoted by the symbol # in the instructional block 152. Thereafter, the microcontroller 16 executes the instructional blocks 106, 112, 116, 118, 120 and 122 in a similar manner as described in connection with the flowchart of FIG. 3. Likewise, the microcontroller 28 responds by executing the instructional blocks 108, 110, 114, 122, 124 and 130 as similarly described by the flowchart of FIG. 3. After receiving the proper response in the decisional block 122, the microcontroller 16, according to the instant operational example, transmits the ATDT command followed by the dialing numerals # to the microcontroller 28 over signal line TD1 through isolator 30 according to the instructions of block 154.

In turn, the microcontroller 28 receives the command and dialing numerals # by block 130 and decodes and responds to the ATDT command in block 156 by configuring the modem chip 36 and filter 38 to the dial operational mode. In addition, the microcontroller 28 also sends the dial number string # to the modem chip. In response, the modem chip autonomously utilizes the dial number string # to establish the corresponding DTMF tones which are transmitted through the filter 38, bridge 42 and out over the telephone lines to the called party. The modem chip 36 then establishes connection with the called party utilizing, for the present embodiment, the Bell 212 protocol. When the modem chip 36 establishes connection, it sets the CD status bit and transmits the connect message or command to the microcontroller 28 over signal line RD2. Accordingly, the microcontrollers 28 and 16 respond to the proper connect command and status by executing the instructional blocks 136, 142 and 146 for microcontroller 28 and 138, 140 and 144 for microcontroller 16. But, in the instant example instead of data flowing from the telephone line to the DTE, the converse occurs and data flows from the DTE via signal line TD through the microcontroller 16 over signal line TD1 through microcontroller 28 over signal line TD2 through the modem chip 36 over signal lines TD3 and out to the telephone line via filter 38 and bridge 42. Similar termination conditions may be used to terminate the data exchange in connection with the foregoing described auto dial example.

Figure 5:
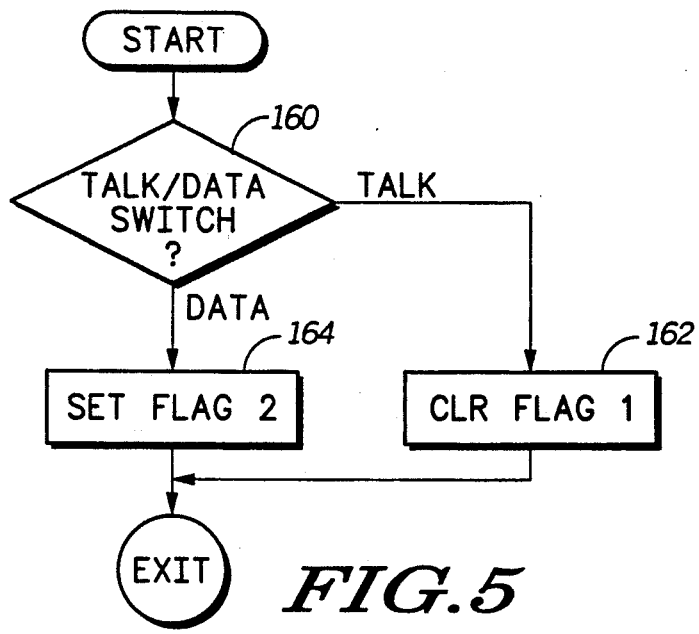
FIGS. 5 and 6 are flowcharts exemplifying another operational aspect of the dual microcontroller embodiment in connection with a talk/data switch of the modem.

In connection with another operational aspect of the present embodiment, the microcontroller 16 may monitor the position of the talk/data switch 52 utilizing signal line 54 to determine if it is in the talk or data position. For example, as shown in the flowchart of FIG. 5, during an initialization routine thereof, the microcontroller 16 may monitor the state of signal 54 in the decisional block 160 for the aforementioned purpose. In the present embodiment, there may be two bits or bytes referred to as flag 1 for the talk mode and flag 2 for the data mode preassigned in the microcontroller 16. Should the result of the decision 160 be talk, then flag 1 bit or byte is cleared by the block 162. Otherwise, if the switch 52 is in the data position in flag 2 is set in block 164. In either case, the talk/data subroutine is thereafter exited and program execution continues elsewhere.

Figure 6:
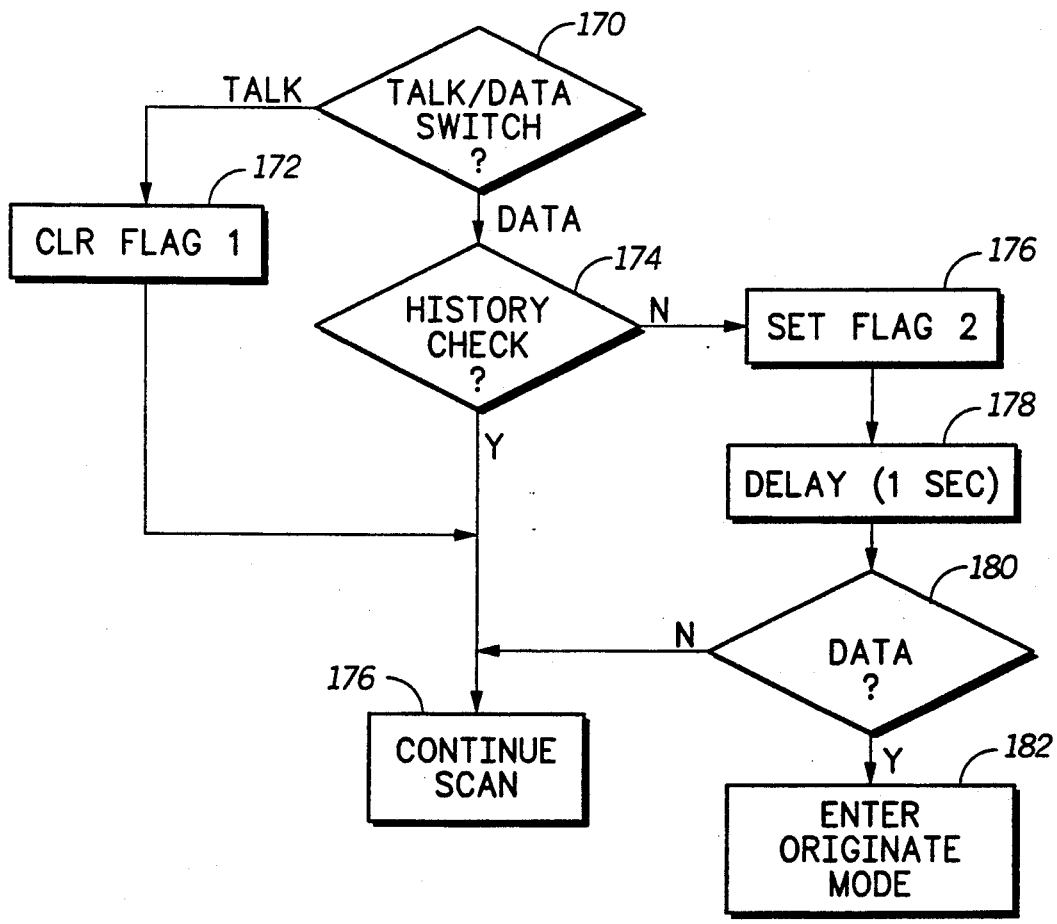

FIG. 6 depicts a flowchart, in connection with the talk/data switch 52, which is executed during a normal operational routine of the microcontroller 16. In the decisional block 170, the signal line 54 is monitored to determine if the switch 52 is in the talk or data position. If in the talk position flag 1 is cleared in block 172. If in the data position, the decisional block 174 is next executed to determine whether or not a history check, which has been described in connection with the flowchart of FIG. 5 has been executed. If executed, the program then continues with its normal flow sequence as exhibited by the block 176. However, if for some reason the history check was not been executed, then the flag 2 is set in the instructional block 176 and the program flow undergoes a delay in block 178. The delay may be on the order of 1 second for the instant embodiment. Next, the program determines whether or not data is to be exchanged in the decisional block 180. If not, execution is then diverted to the normal sequence exhibited at 176. Otherwise, the program flow is caused to enter an originate mode by the block 182 to commence data exchange.

While the present invention has been described above in connection with a single embodiment, it is understood that additions, deletions and modifications may be made thereto or even or equivalent embodiment substituted therefor without deviating from the broad principles of the present invention. Accordingly, the present invention should not be limited to any single embodiment, but rather construed in breadth and scope in accordance with the recitation of the appended claims.

What is claimed is:

1. Data Communication Apparatus (DCA) interfaceable to data terminal apparatus (DTA) on one side thereof and to a telephone line of a telephone network on another side thereof, said one side of the DCA being electrically isolated from said another side of the DCA, said one side of the DCA comprising:

first programmed digital signal processor (DSP) means interfaceable to said DTA over a plurality of first signal lines for exchanging command and data information therebetween; and first source of power for deriving power from at least one of said first signal lines to supply the power to said first programmed DSP means;

said another side of the DCA comprising:

second programmed digital signal processor (DSP) means coupled to said first programmed DSP means by a plurality of second signal lines for exchanging command and data information therebetween;

modem means coupled to said second programmed DSP means and interfaceable to said telephone line, said modem means being governed by said second programmed DSP means to establish a call connection over said telephone line and to condition data exchanged between said second programmed DSP means and said telephone line during said call connection; and second source of power for deriving power from said telephone line to supply the power to said second programmed DSP means and modem means; and said DCA including:

electrically isolating means for electrically isolating said one side of the data communication apparatus from said another side of the data communication apparatus, said one side of the data communication apparatus including said first programmed digital signal processor means, said another side of the data communication apparatus including said second programmed digital signal processor means.

2. The DCA in accordance with claim 1 wherein the electrically isolating means includes a plurality of electrically isolating devices, one of the plurality of electrically isolating devices being disposed in each of the plurality of second signal lines.

3. The DCA in accordance with claim 2 wherein each of the plurality of electrically isolating devices includes an optical isolator.

4. The DCA in accordance with claim 3 wherein the plurality of second signal lines includes: a signal line for conducting commands and serial digital data from the first programmed DSP means to the second programmed DSP means for transmission over the telephone line; a signal line for conducting commands and serial digital data from the second programmed DSP means to the first programmed DSP means for reception from the telephone line; and a signal line for conducting from the second to the first DSP means a signal indicating establishment of call connection.

5. The DCA in accordance with claim 4 wherein the modem means includes means coupled to the telephone line for detecting a call ringing signal and generating a signal indicative thereof; and wherein the electrically isolating means includes an electrically isolating device for coupling said ring indication signal to the first programmed DSP means.

6. The DCA in accordance with claim 3 including a switching means for connecting the telephone line to the modem means when activated; and means governed by the first programmed DSP means to activate the switching means, said activating means being electrically isolated from the first programmed DSP means.

7. The DCA in accordance with claim 3 including means governed by the first programmed DSP means to activate the second source of power to supply power, said activating means being electrically isolated from the first programmed DSP means.

8. The DCA in accordance with claim 3 wherein the first programmed DSP means includes means utilizing the second signal lines for configuring an operational mode of the second programmed DSP means.

9. The DCA in accordance with claim 8 wherein the configuring means of the first programmed DSP means includes means responsive to a command from the DTA for configuring the operational mode of the second programmed DSP means.

10. The DCA in accordance with claim 3 wherein the second programmed DSP means includes means responsive to a command from said first programmed DSP means to configure the modem means to an operational mode.

11. The DCA in accordance with claim 10 wherein the second programmed DSP means includes means responsive to a connect signal from the modem means for establishing data exchange between the second programmed DSP means and the telephone line through the modem means.

12. The DCA in accordance with claim 11 including a talk/data switch coupled between the telephone line and a TELSET jack connection; and means for monitoring the state of said talk/data switch and providing a signal indicative thereof over a signal path to the first programmed DSP means; said first programmed DSP means including means responsive to said indication signal for configuring the programmed operation thereof.

* * * * *